Feb. 5, 1963    G. J. BUSHELL ETAL    3,076,330
TESTER FOR AUTOMATIC TRANSMISSION PARTS
Filed Dec. 29, 1959    2 Sheets-Sheet 1

George J. Bushell
Ross Thornton
INVENTORS

George J. Bushell
Ross Thornton
INVENTORS

United States Patent Office 3,076,330
Patented Feb. 5, 1963

3,076,330
TESTER FOR AUTOMATIC TRANSMISSION PARTS
George J. Bushell and Ross Thornton, both of 503 24th St., Bakersfield, Calif.
Filed Dec. 29, 1959, Ser. No. 862,538
7 Claims. (Cl. 73—40)

This invention relates generally to testing equipment and more particularly to a novel testing device particularly adapted for testing torus covers or pump covers in the various types of fluid transmitters associated with automatic transmission systems.

In trouble-shooting automobile automatic transmissions, it is often necessary to inspect the torus and pump covers and test them to determine the possible presence of leaks in the hub welds, rivets, bolts or gaskets while under pressure. Although there are means, presently available for testing the various covers, they are all laden with certain disadvantages which it is the principal object of this invention to overcome.

In order to eliminate all guesswork in the testing of various automatic transmission covers for leaks, the testing device disclosed below is utilized. The device includes an air chamber and clamp means which are adapted to clamp the cover against an O-ring disposed on the open end of the air chamber with the cover sealing the chamber. Ordinary pressurized shop air hoses may be utilized to pressurize the air chamber and if no leaks are noticed when the cover is under pressure, it will prove to the automobile owner that the cover is in proper shape relative to the leakage features. If of course, leaks are found, the cover may be replaced or repaired in a minimum of time-saving both time and expense.

It is a further object of this invention to provide a testing device which is extremely simple in design, light and compact and durable and inexpensive to manufacture. It is contemplated that the entire device be made of steel and welded throughout for safe dependable service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
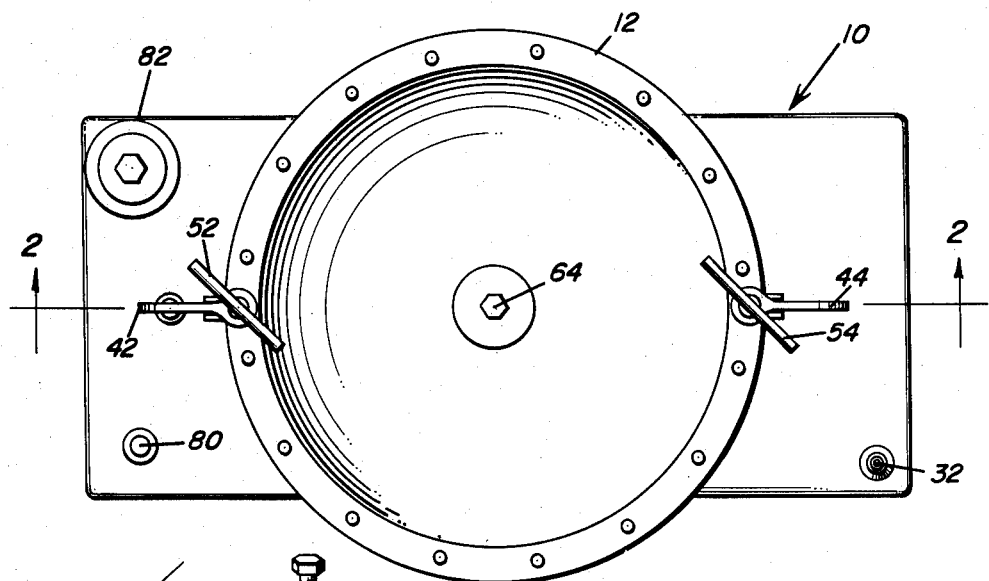
FIGURE 1 is an elevational plan view of the testing device illustrating an automatic transmission cover clamped in sealing relationship with the air chamber.
Figure 4:
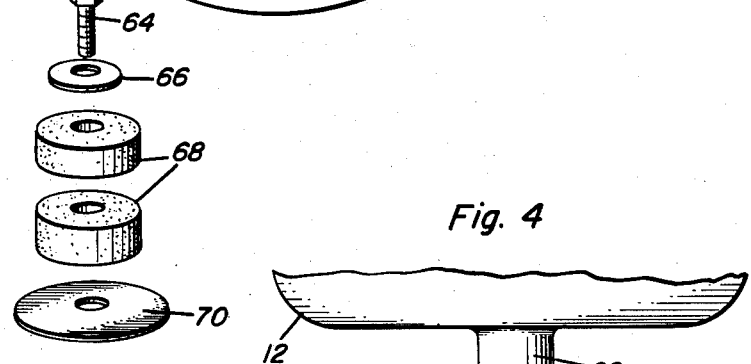
FIGURE 4 is a fragmentary elevational view illustrating the bottom portion of the cover with an expansion plug received in the hub thereof.
Figure 5:
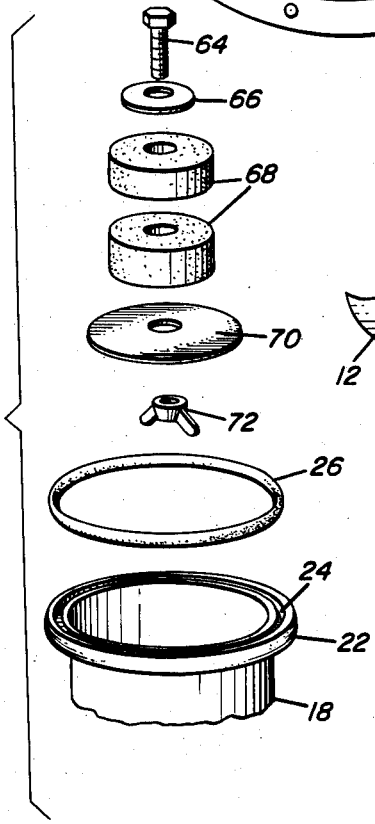
FIGURE 5 is a disassembled perspective view of the various elements of the expansion plugs, O-ring, and fragmentary view of the air chamber.

With continuing reference to the drawings, the numeral 10 generally represents the testing device comprising this invention and adapted to be utilized with an automatic transmission cover at 12 which is to be tested.

The testing device 10 initially includes a hollow or channel-shaped base 14 which has a flat upper surface 16. A cylindrical member 18 is secured to the top surface 16 of the base 14 as by welding 20. The top surface 16 of the base 14 seals the cylindrical member 18 at the lower end thereof. The upper end of the cylindrical member 18 is flared outwardly as at 22. The flared portion 22 has a circular groove 24 formed therein for accommodating an O-ring 26.

An opening 28 is formed in the top surface 16 of the base 14 and a tube 30 communicates with the opening. A check valve 32 is supported on the top surface 16 of the base 14 and is communicated with the opening 28 by the tube 30. Accordingly, it will be appreciated that pressurized gas such as air may be moved from a conventional shop air hose, through the check valve 32, through the tube 30, through the opening 28 and into the air chamber defined by the cylindrical member 18.

Figure 2:
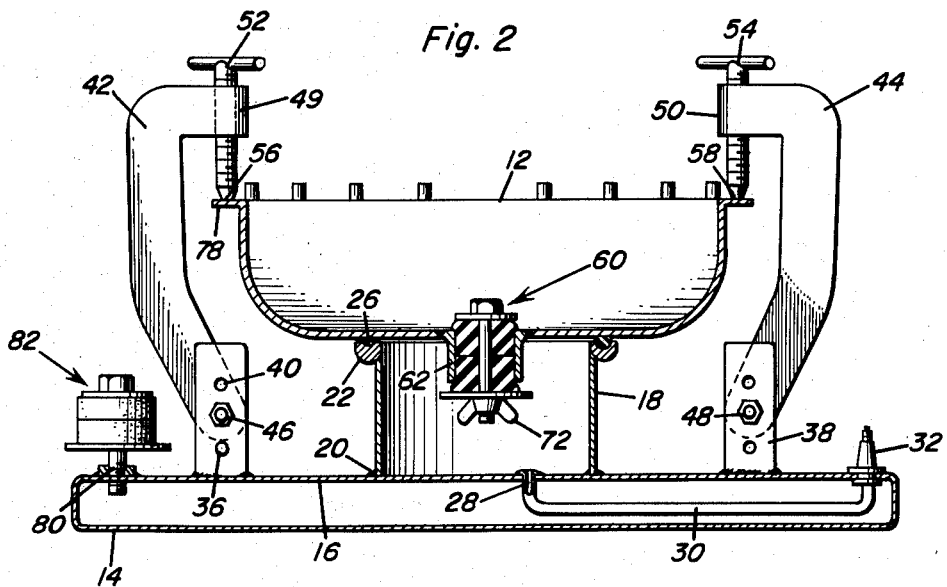
FIGURE 2 is a vertical sectional view taken substantially along the plane 2—2 of FIGURE 1.
Figure 3:
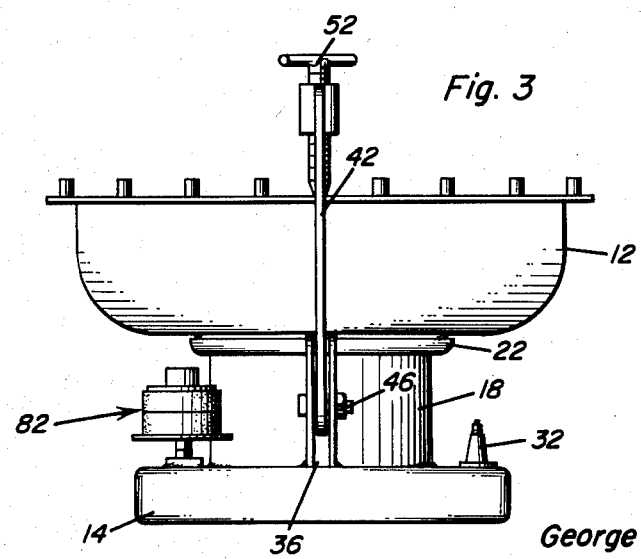
FIGURE 3 is an elevational end view of the testing device with the cover clamped thereon.

A pair of standards 36 and 38 are welded to the top surface 16 of base 14 and extend perpendicularly upwardly therefrom. The standards 36 and 38 are bifurcated, as is particularly illustrated in FIGURE 3 and include aligned apertures therethrough as 40. A pair of C-shaped members 42 and 44 are provided and are respectively pivoted to the standards 36 and 38 by nut and bolt combinations 46 and 48. The C-shaped members 42 and 44 include portions 49 and 50 adapted to be disposed horizontally, as indicated in FIGURE 2, when the C-shaped members 42 and 44 are pivoted properly about the nut and bolt combinations 46 and 48. Winged screws 52 and 54 having flat terminal bearing surfaces 56 and 58 threadedly extend through the horizontal portions 49 and 50 of the C-shaped members 42 and 44.

It is desired to test the automatic transmission cover 12 to determine the presence of leaks between portions thereof secured by imperforate fasteners such as the hub welds, rivets, bolts, or gaskets, while under pressure. In order to do this, an expansion plug generally designated as 60 is received in the hub 62 of the cover 12. The expansion plug 60 includes a long hexagonally headed bolt 64 which extends through a first metallic washer 66, a pair of expansible rubber washers 68, a second metallic washer 70, and then receives thereon a winged nut 72. The expansion plug 60 is received in the hub 62 of the cover 12 as illustrated particularly in FIGURE 2, with the wing nut 72 being screwed tightly to expand the expansible rubber washer 68 to completely seal the cover 12. The cover 12 is then placed on the air chamber 18 with the cover in contact with the O-ring 26 received in the groove 24 on the flared portion 22 of the cylindrical member 18. The C-shaped clamps 42 and 44 are then pivoted into the position illustrated in FIGURES 1 through 3 and the wing screws 52 and 54 are screwed downwardly so that the terminal bearing ends thereof force the flange 78 of the cover 12 downwardly and carry the cover 12 into sealing engagement with the O-ring 26. Air is then forced through the check valve 32, which may be combined with a gauge to indicate the air pressure, and then a sufficient amount of a non-rusting solution is poured into the cover 12. The pressure in the air chamber defined by the top surface 16 of base 14, the cylindrical member 18, and the cover 12, will force air through any cracked welds, loose rivets, loose bolts or defective gaskets, causing air bubbles to be created in the non-rusting solution. Therefore, any leaks present will be detected.

Inasmuch as different size expansion plugs must be utilized so as to properly fit the various automatic transmission covers which it is desired to fit, openings as 80 may be formed in the top surface 16 of the base 14 so that auxiliary expansion plugs 82 may be received therein for use as desired with the particular cover requiring it.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A testing device for automatic transmission parts for detecting leaks in torus covers comprising a base, an open cylindrical member having a first and second end, said cylindrical member secured to said base for sealing a first end of said member, a tube extending into said cylindrical member adjacent the first end thereof and means for sealing said second end of the cylindrical member with said torus cover in a horizontal position to hold leakage detection fluid therein.

2. The combination of claim 1, wherein said sealing means comprises a flared portion on said second end of said cylindrical member, a groove formed in said flared portion, and an O-ring received in said groove, and clamp means supported by said base extending above second end of said cylindrical member for clamping the torus cover on said member against said O-ring.

3. The combination of claim 2, wherein said clamp means includes a pair of diametrically opposed standards secured to said base, C-shaped members pivoted to said standards and screw means carried by said C-shaped members adapted to bear against a torus cover for clamping said cover against said O-ring.

4. Testing apparatus for a torus cover of a fluid transmitter having a central opening therein and portions fastened to each other by imperforate fasteners comprising, base means, gas chamber means supported and sealed at a lower end thereof by said base means, sealing means mounted at an upper end of the chamber means for supporting the torus cover in fluid sealed relation to the upper end of the chamber means, clamp means movably mounted on the base means and engageable with the torus cover to maintain the torus cover in horizontal sealing position on the upper end of the chamber means, sealing plug means inserted in the central opening of the torus cover for completing the sealing of the chamber means and leakage detecting liquid received within the horizontally positioned torus cover above the chamber means for detecting escape of gas from said chamber means by leakage between the portions fastened by said imperforate fasteners.

5. The combination of claim 4 including conduit means enclosed within said base means having one end in communication with said chamber means at the lower end of the chamber means, one-way check valve means mounted on the base means connected to the other end of the conduit means for supply of air under pressure to the chamber means.

6. The combination of claim 5, wherein said clamp means includes a plurality of pivoted clamp members threadedly mounting engaging elements for engaging a peripheral rim portion of the torus cover to apply sealing pressure thereto when in the horizontal position on the sealing means.

7. The combination of claim 4 wherein said clamp means includes a plurality of pivoted clamp members threadedly mounting engaging elements for engaging a peripheral rim portion of the torus cover to apply sealing pressure thereto when in the horizontal position on the sealing means.

References Cited in the file of this patent

UNITED STATES PATENTS

| | | |
|---|---|---|
| 1,370,437 | Gustafson | Mar. 1, 1921 |
| 1,371,484 | Howard | Mar. 15, 1921 |
| 1,671,935 | Price | May 29, 1928 |